T. S. CRANE.
Belt-Shifter.
No. 160,259.                    Patented March 2, 1875.
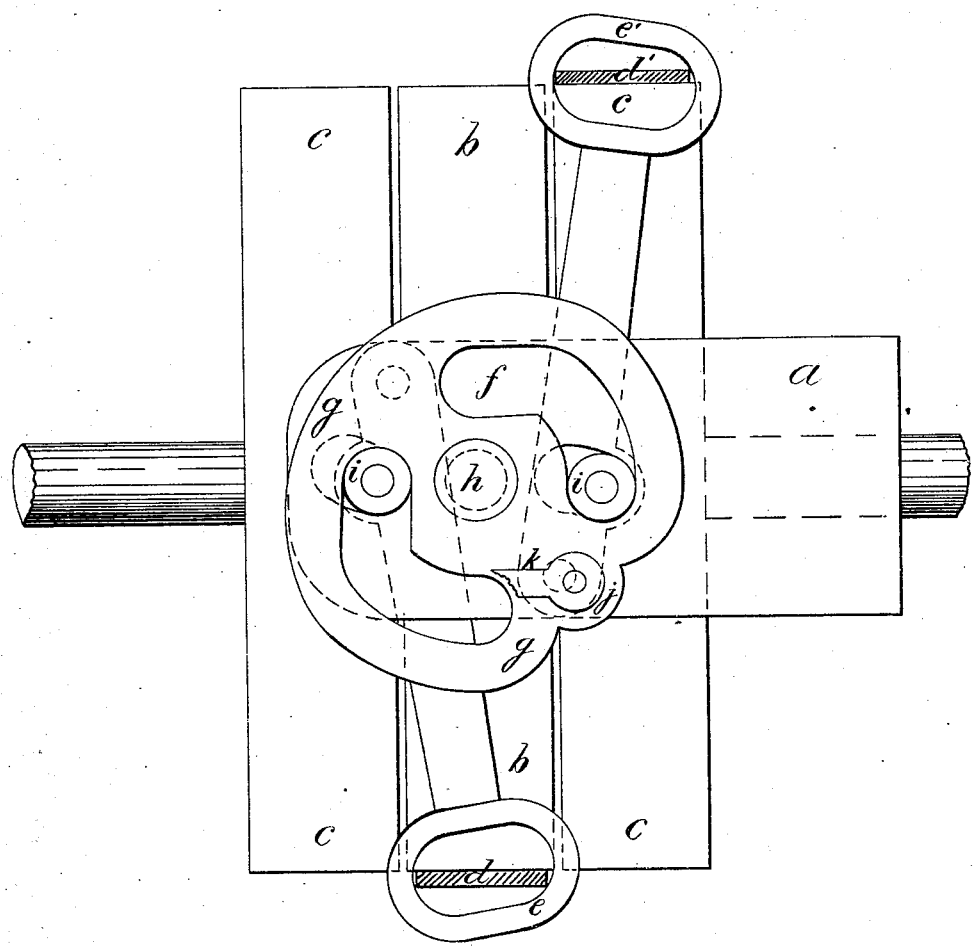
Witnesses.
Inventor.
Thos. S. Crane

UNITED STATES PATENT OFFICE.

THOMAS S. CRANE, OF NEWARK, NEW JERSEY, ASSIGNOR OF TWO-THIRDS HIS RIGHT TO CHARLES M. BOLEN AND FREDERICK K. DAY, OF SAME PLACE.

IMPROVEMENT IN BELT-SHIFTERS.

Specification forming part of Letters Patent No. 160,259, dated March 2, 1875; application filed December 31, 1874.

*To all whom it may concern:*

Be it known that I, THOMAS S. CRANE, of Newark, New Jersey, have invented an Improvement in Belt-Shippers, of which the following is a specification:

My invention relates to a device for moving belts when two of them are employed in any arrangement that requires them to be alternately shifted upon or onto the same pulley.

The drawing shows a support, $a$, arranged at a suitable distance from the tight pulley $b$ and the loose pulleys $c$ $c$, upon which are shown the two belts $d$ $d'$. These belts may be driven at different speeds which it is desirable to convey to the tight pulley $b$, or they may be driven in opposite directions, as shown in the drawing, for reversing the motion of $b$. The object of my invention is to design a belt-shipper that shall move the belt $d$ off of the tight pulley $b$ before moving the belt $d'$ upon the same pulley, as is done in those shippers that move both belts simultaneously. To effect this object I pivot the two shippers $e$ $e'$ upon the support $a$, and provide each one with a pin or roller, $i$, working in a slot, $f$, in the disk $g$. It will be seen in the drawing that a portion of each slot $f$ is concentric with the center $h$, upon which the disk rotates, and therefore causes no movement of the roller $i$ $i$ or shippers $e$ $e'$ when the disk rotates. One extremity of each slot is, however, inclined toward or away from the center of the disk, and as the roller enters that portion of the slot it is drawn toward or away from the center of the disk, and the shipper is correspondingly moved.

The slots in the disk are so adjusted that the roller $i$ upon one of the shippers is in the concentric part of its own slot when the roller upon the other shipper is being moved by the inclined part of its slot, thus insuring a movement of each shipper in the manner desired—viz., off of the tight pulley, or leading its belt away from the same, while the other shipper stands still during such movement. The disk $g$ may be a plain round plate or have its periphery correspond with the slots, as shown in the drawing. It is provided, at $j$, with a connection, $k$, to which a reciprocating motion can be applied to rotate the disk, or it may be moved in any convenient manner.

I am aware that disks with projections upon their peripheries have been employed before for the purpose of operating shippers, and I do not, therefore, claim the exclusive use of the disk for that purpose; but What I do claim, and desire to secure by Letters Patent, is—

The combination and arrangement of two shippers, $e$ $e'$, support $a$, and slots $f$ $f$ on disk $g$, with the belts $d$ $d'$ and pulleys to be driven by the same, when operated substantially in the manner and for the purpose described.

THOS. S. CRANE.

Witnesses:
ARAM G. SAYRE,
GEO. R. DUNN.